United States Patent [19]
Choi et al.

[11] Patent Number: 5,204,893
[45] Date of Patent: Apr. 20, 1993

[54] METHOD AND AN APPARATUS FOR TRANSMITTING/RECEIVING SIGNALS IN A VIDEO PHONE

[75] Inventors: Hyun J. Choi, Kumi; Hak R. Kim, Daekujikhal, both of Rep. of Korea

[73] Assignee: Gold Star Co., Ltd., Seoul, Rep. of Korea

[21] Appl. No.: 703,916

[22] Filed: May 22, 1991

[30] Foreign Application Priority Data

May 22, 1990 [KR] Rep. of Korea ............... 7361/1990
Jul. 31, 1990 [KR] Rep. of Korea ............. 11651/1990

[51] Int. Cl.$^5$ .................... H04N 1/42; H04N 7/14
[52] U.S. Cl. ........................... 379/53; 379/54; 358/85
[58] Field of Search ............. 379/53, 54, 96, 97, 379/98; 358/85

[56] References Cited

U.S. PATENT DOCUMENTS

| | | | |
|---|---|---|---|
| 3,873,771 | 3/1975 | Kleinerman | 379/53 |
| 4,481,622 | 11/1984 | Cheng et al. | 379/97 |
| 4,701,946 | 10/1987 | Oliva et al. | 379/98 |
| 4,849,811 | 7/1989 | Kleinerman | 379/98 |
| 5,063,587 | 11/1991 | Semasa et al. | 379/53 |

FOREIGN PATENT DOCUMENTS 2173675 10/1986 United Kingdom ............... 379/53

*Primary Examiner*—James L. Dwyer
*Assistant Examiner*—Jason Chan
*Attorney, Agent, or Firm*—John P. White

[57] ABSTRACT

A method and an apparatus for transmitting and receiving a voice signal simultaneously with a video signal via a single transmission line in a video phone. The apparatus comprises video signal receiving means for discriminating if a carrier frequency in the video signal being sent via the transmission line from a counterpart is which of a second frequency or a third frequency set within a frequency band of transmission line, demodulating the video signal with one of the second and third frequencies depending upon the discriminated result, and outputting the demodulated video signal to a displaying monitor; and video signal transmitting means for inputting the video signal from a self-camera, modulating the video signal with the other of the second and third frequencies and outputting the modulated video signal to the transmission line. The method comprises the steps of turning on/off power, designating the second frequency or the third frequency as carrier frequency of the video signal for transmitting, and performing only voice telephone call. In accordance with the present method and apparatus, the simultaneous transmission and reception of the video signal between a caller and the counterpart can be established via the single transmission line in the video phone, as well it is possible to send the voice signal simultaneously with the video signal via the single transmission line in the video phone.

6 Claims, 8 Drawing Sheets

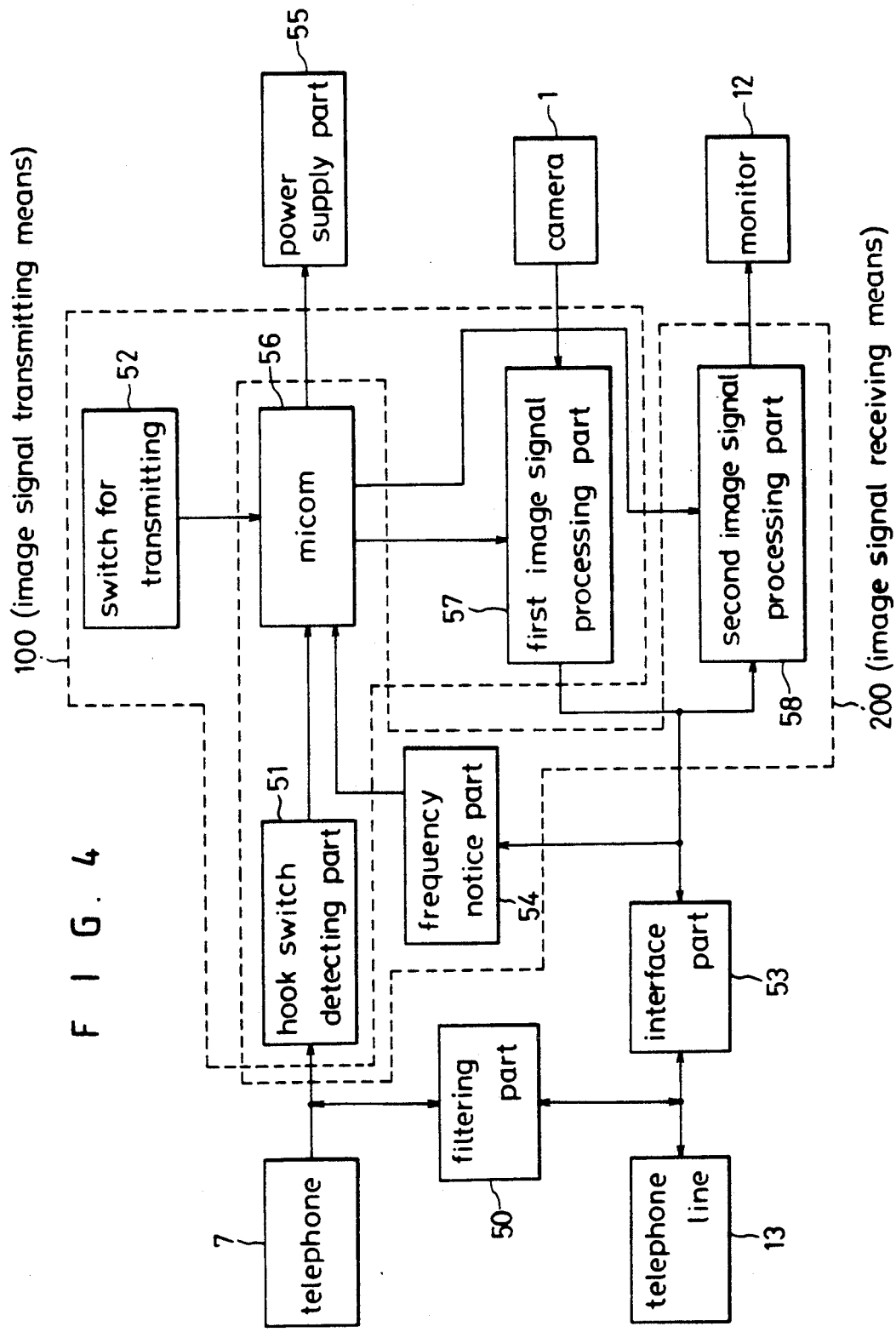

METHOD AND AN APPARATUS FOR TRANSMITTING/RECEIVING SIGNALS IN A VIDEO PHONE

BACKGROUND OF THE INVENTION

1. Field of the Invention

The present invention relates in general to a method and an apparatus for transmitting and receiving signals in a video phone, and more particularly to a method and an apparatus for transmitting and receiving a voice signal simultaneously with a video signal via a single transmission line in the video phone.

2. Description of the Prior Art

Generally, there has been employed a telephone line as a transmission line in a video phone.

FIG. 1 is a block diagram of a generic construction of a conventional apparatus for transmitting and receiving signals in the video phone employing the telephone line. As shown in the drawing, the conventional apparatus comprises a camera 1 for taking an image of a caller, an A/D converter 2 for digitizing a video signal outputted from the camera 1, a first memory unit 3 for storing an output signal from the A/D converter 2, a modulator 4 for modulating the signal, or digitized video signal, stored in the first memory unit 3, a first amplifier 5 for amplifying an output signal from the modulator 4 by a predetermined amplification degree, a second amplifier 8 for amplifying a digitized video signal from a counterpart by a predetermined amplification degree, a demodulator 9 for demodulating an output signal from the second amplifier 8, a second memory unit 10 for storing an output signal from the demodulator 9, a D/A converter 11 for converting the signal, or digitized video signal from the counterpart, stored in the second memory unit 10 into an analog signal to output the analog signal, or video signal to a monitor 12, a control circuit 14 connected between the first and the second memory units 3 and 10 and the A/D converter 2, for feeding desired address and control signals to them, a standard telephone 7, and a switching circuit 6 connected among an output terminal of the first amplifier 5, an input terminal of the second amplifier 8, the telephone 7 and a telephone line 13, for selectively connecting the output terminal of the first amplifier 5, the input terminal of the second amplifier 8 or the telephone 7 to the telephone line 13 in accordance with some conditions.

The operation of the conventional apparatus with the above-mentioned construction will now be described.

The image of the face of the caller, taken by the camera 1, is an analog signal, which is converted by the A/D converter 2 upon receiving a clock from the control circuit 14, into a digital signal to be stored into the first memory unit 3. Also, the control circuit 14 feeds address and control signals to the first memory unit 3. Data stored in the first memory unit 3 is modulated suitably to a line characteristic by the modulator 4 and then is transferred through the first amplifier 5 to the switching circuit 6, which sends the data out over the telephone line, thereby enabling the video signal to be sent to the counterpart.

On the other hand, upon receiving the image data, or digitized video signal, from the counterpart, the switching circuit 6 transfers the digitized video signal to the second amplifier 8, as a receiving amplifier, and then to the demodulator 9. The demodulated signal from the demodulator 9 is stored into the second memory unit 10 under the control of the control circuit 14 and the signal stored in the second memory unit 10 is then converted by the D/A converter 11 into an analog signal to be displayed on the monitor 12. Thus, the caller can see the face of the counterpart through the monitor.

FIG. 2 is a detailed circuit diagram of a part P including the telephone 7 and the switching circuit 6, shown in FIG. 1. As shown in the drawing, upon pushing a transmitting switch 15 under the condition that the caller would like to send his image to the counterpart while the caller telephones a message to the counterpart, a controller 16 outputs a control signal to a switch 17. A terminal c of the switch 17, having been connected to a terminal b during voice telephone call, is thus connected to a terminal a to send the video signal out to the counterpart via the telephone line 13, similarly to the case that the counterpart would like to send his image to the caller.

Namely, the terminal c of the switch 17 is connected to the terminal a in the transmission and reception of the video signal, while to terminal b in the voice telephone call. As a result, no transmission and reception of the voice signal can be performed under the condition of the transmission and reception of the video signal.

Referring next to FIG. 3 which is a circuit diagram of an embodiment of the conventional apparatus for transmitting and receiving signals in the video phone employing the telephone line, the conventional apparatus is shown to comprise a transmitting transformer 18 connected between the standard telephone 13 and telephone 7, for interfacing the video signal to be transmitted, a receiving transformer 19 connected between the standard telephone 13 and telephone 7 for interfacing the video signal to be received, a first video signal processing circuit 20 for processing the video signal to be transmitted, a second video signal processing circuit 21 for processing the video signal to be received, a relay 22 including two relay switches 22a and 22b, for operating to send only one of the voice signal and the video signal via the telephone line 13, and a controller 23 for applying a drive control signal to the relay 22 and the first and the second video signal processing circuits 20 and 21. In the drawing, the reference numeral 24 designates a surge voltage absorbing triac, R1 to R7 resistors and C1 to C7 capacitors.

The operation of the conventional apparatus with the above-mentioned construction will now be described.

When, normal times, the caller is to telephone a message to the counterpart, one lines L2 and T2 of the telephone line 13 and the telephone 7 are connected directly to each other and the other lines L1 and T1 are connected via the transmitting transformer 18 to each other, in order to send the voice signal to the counterpart, thereby allowing the telephone call. On the other hand, the relay 22 is driven under the control of the controller 23 and states of the relay switches 22a and 22b therein thus are changed to short lines T1 and T2 of the telephone 7, thereby preventing the voice signal from being sent to the counterpart. As a result, it is impossible to send the voice signal to the counterpart.

The controller 23 then operates to control the first video signal processing circuit 20 to send the video signal via the telephone line 13.

On the other hand, the controller 23 operates to control the second video signal processing circuit 21 to receive the video signal, even in the reception of the video signal from the counterpart, similarly to the case of the transmission of the video signal.

With the above-mentioned construction, however, the conventional apparatus cannot transmit and receive the voice signal simultaneously with the video signal via the single transmission line in the video phone, thereby resulting in the stand-by status of the one side in the course of transmission of the video signal from the other side. In result, the transmission and reception of the video signal between the caller and the counterpart by the conventional apparatus as stated above takes too much time.

SUMMARY OF THE INVENTION

Therefore, it is an object of the present invention to provide a method and an apparatus for transmitting and receiving a voice signal simultaneously with a video signal via a single transmission line in a video phone between a caller and a counterpart.

In accordance with one aspect of the present invention, in a video phone for transmitting and receiving a video signal and a voice signal by means of a single transmission line, said video phone having a standard telephone having a hook switch, a displaying monitor and a self-camera, there is provided an apparatus for transmitting and receiving the voice signal simultaneously with the video signal via the single transmission line, said apparatus comprising: filtering means connected between said telephone and said transmission line, for inputting the voice signal from either said telephone or said transmission line and passing only voice signal with a frequency region below a first frequency set within a frequency band of said transmission line; video signal receiving means for discriminating if a carrier frequency in the video signal being sent via said transmission line from a counterpart is which of a second frequency or a third frequency set within said frequency band of said transmission line, demodulating the video signal by one of said second and third frequencies depending upon the discriminated result, and outputting the demodulated video signal to said displaying monitor; video signal transmitting means for inputting the video signal from said self-camera, modulating the video signal with the other of said second and third frequencies differently from said video signal receiving means and outputting the modulated video signal to said transmission line; and interfacing means connected among said transmission line; said video signal receiving means and said video signal transmitting means, for separately outputting the video signals to be received and transmitted.

In accordance with another aspect of the present invention, in a video phone for transmitting and receiving a video signal and a voice signal by means of a single transmission line, said video phone having a standard telephone having a hook switch, a displaying monitor and a self-camera, there is provided a method of transmitting and receiving the voice signal simultaneously with the video signal via the single transmission line, said method comprising the steps of: turning on power if said hook switch of said telephone is turned from an original ON state into an OFF state; designating a second frequency set within a frequency band of said transmission line as a carrier frequency of the video signal for transmission and a third frequency set within said frequency band of said transmission line as a carrier frequency of the video signal for reception upon receiving a control signal for transmission of the video signal, modulating and demodulating the video signals to be transmitted and received, in accordance with said designated frequencies, transmitting and receiving the modulated and demodulated video signals, and turning off power after the sending of the modulated and demodulated video signals is finished; designating the other of said second frequency and said third frequency as the carrier frequency of the video signal for transmission upon receiving the video signal with one of said second frequency and said third frequency from a counterpart and no control signal for transmission of the video signal, modulating and demodulating the video signals to be transmitted and received, in accordance with said designated frequencies, transmitting and receiving the modulated and demodulated video signals until said hook switch is turned into said ON state, and turning off power after the sending of the modulated and demodulated video signals is finished; and performing only voice telephone call upon receiving no either the control signal for transmission of the video signal or the video signal from the counterpart.

BRIEF DESCRIPTION OF THE DRAWINGS

The above and other objects, features and advantages of the present invention will be more clearly understood from the following detailed description taken in conjunction with the accompanying drawings, in which:

FIG. 4 is a block diagram of a construction of an apparatus for transmitting and receiving signals in the video phone in accordance with the present invention;

DETAILED DESCRIPTION OF PREFERRED EMBODIMENTS

Figure 1:
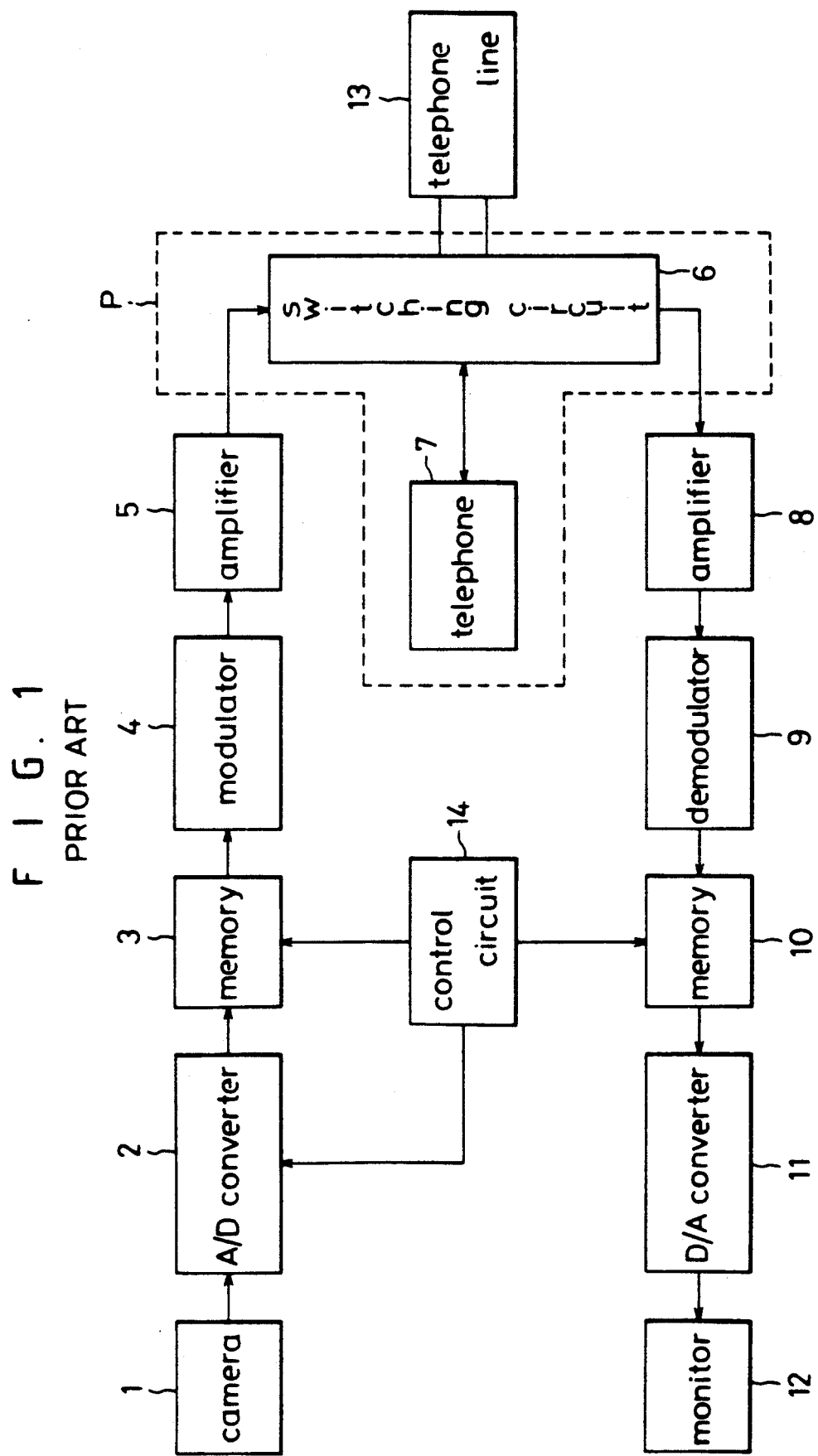
FIG. 1 is a block diagram of a generic construction of a conventional apparatus for transmitting and receiving signals in a video phone.
Figure 2:
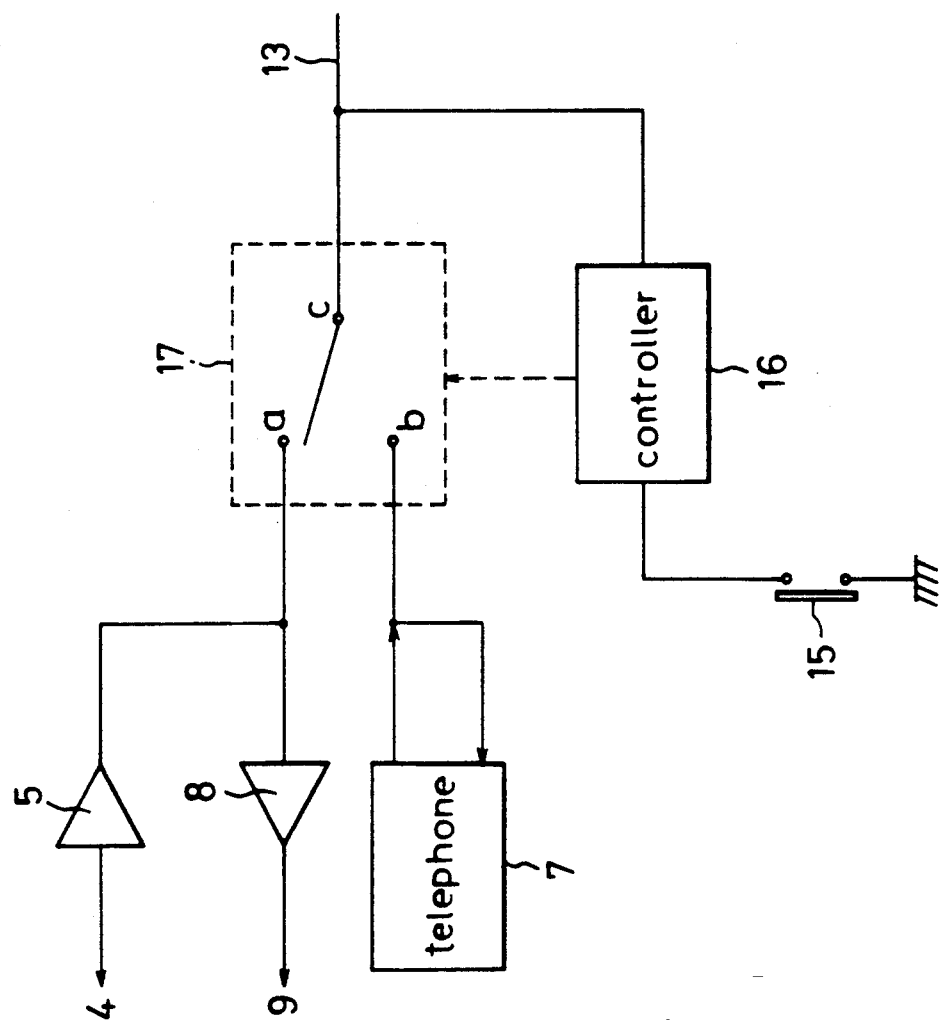
FIG. 2 is a detailed circuit diagram of a part P in FIG. 1.
Figure 3:
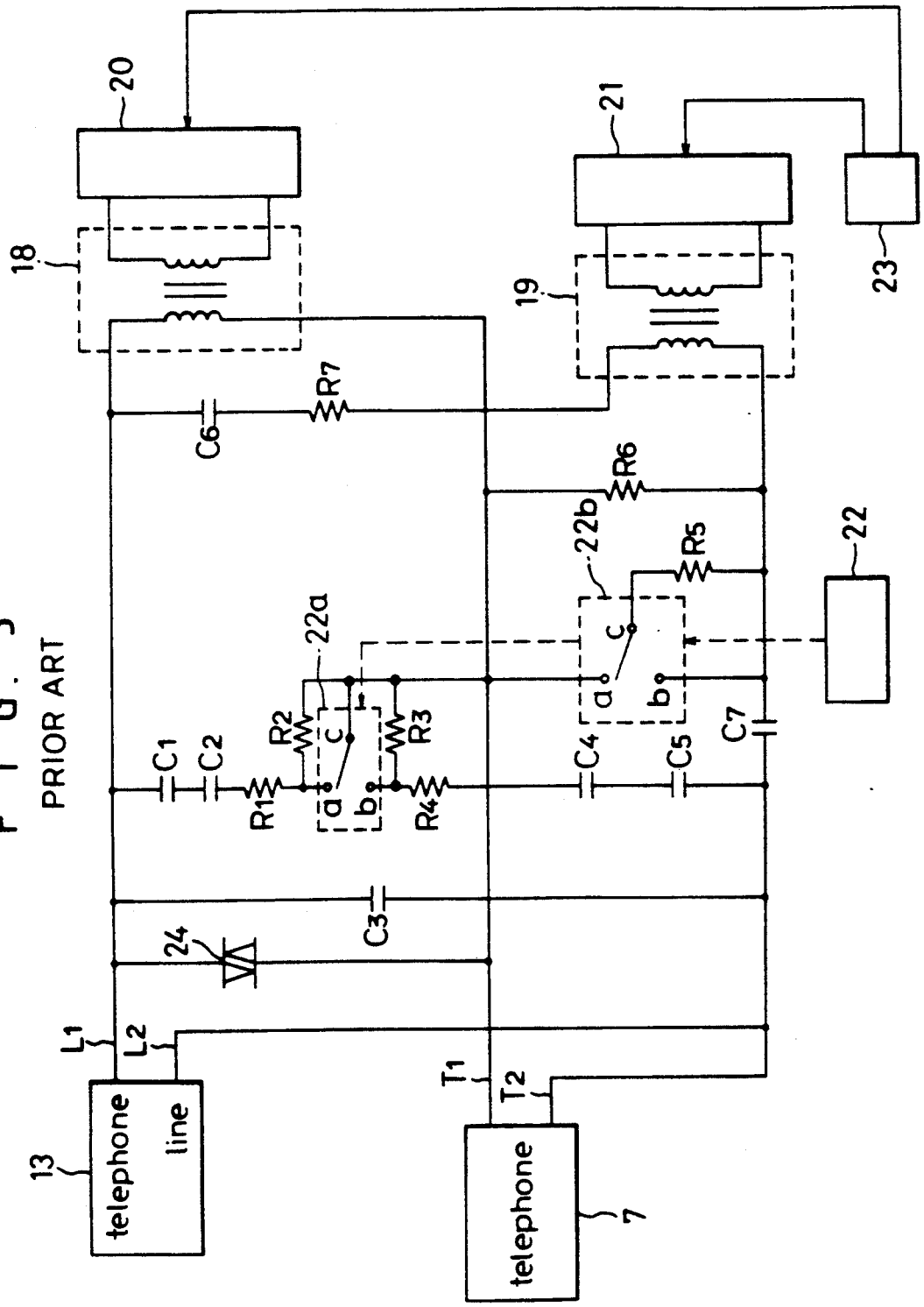
FIG. 3 is a circuit diagram of an embodiment of the conventional apparatus for transmitting and receiving signals in the video phone.

First, a construction of an apparatus for transmitting and receiving signals in a video phone in accordance with the present invention will be described with reference to FIG. 4.

In FIG. 4, the apparatus for transmitting and receiving signals in the video phone in accordance with the present invention is shown to comprise a filter 50 connected between a telephone 7 and a telephone line 13, for inputting a voice signal from either telephone 7 or telephone line 13 and passing only voice signal with a frequency region below a first frequency f1 set within a frequency band of the telephone line 13.

Also, the apparatus according to the present invention comprises a hook switch sensor 51 for sensing ON/OFF states of a hook switch (not shown), a transmitting switch 52 for outputting a control signal for transmission of video signal, an interface unit 53 for separately outputting video signals to be received and transmitted, a frequency discriminator 54 for discriminating if a carrier frequency in the video signal to be received is which of a second frequency f2 or a third frequency f3 set within the frequency band of the telephone line 13 and outputting a acknowledge signal depending upon the discriminated result, a power supply 55 for supplying power required by the apparatus, and a microprocessor 56 for inputting output signals from the hook switch sensor 51, the transmitting switch 52 and the frequency discriminator 54 and outputting a plurality of control signals necessary to the operation of the apparatus.

The apparatus according to the present invention is also provided with a first and a second video signal processing circuits 57 and 58. The first video signal processing circuit 57 inputs the video signal from a self-camera 1 and operates to send the inputted video signal to the counterpart. Namely, the first video signal processing circuit 57 modulates and band-pass filters the inputted video signal by a predetermined frequency in response to the control signal from the microprocessor 56 and outputs such modulated and band-pass filtered video signal to the interface unit 53. The second video signal processing circuit 58 operates to display the video signal inputted through the interface unit 53 on a monitor 12. That is, the second video signal processing circuit 58 demodulates and band-pass filters the inputted video signal by a predetermined frequency in response to the control signal from the microprocessor 56 and outputs such demodulated and band-pass filtered video signal to the monitor 12.

Figure 6:
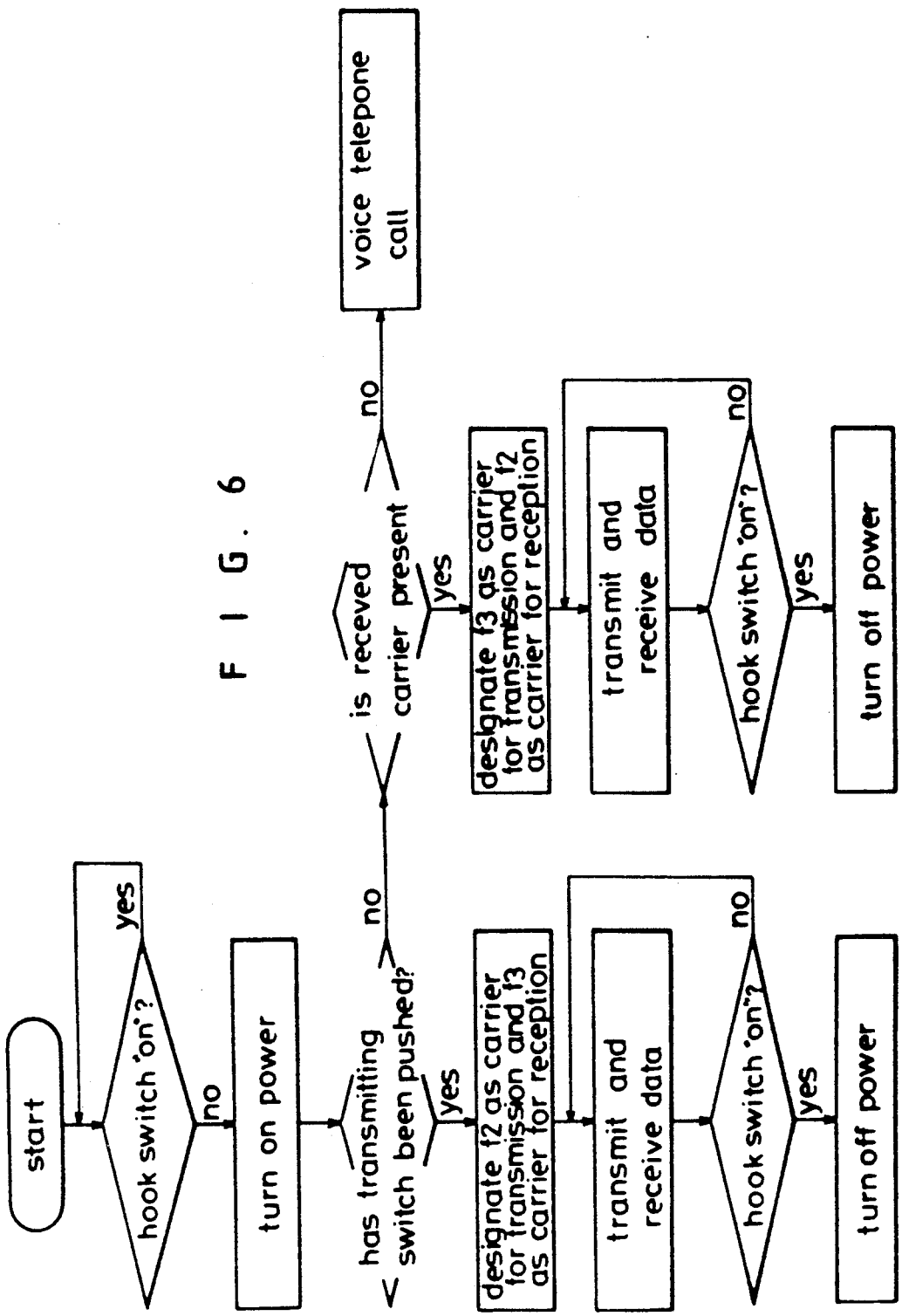
FIG. 6 is a flowchart illustrating a method of transmitting and receiving signals in the video phone in accordance with the present invention.

Next, the operation of the apparatus with the above-mentioned construction in accordance with the present invention will be described in detail with reference to a flowchart of FIG. 6.

The power-ON/OFF of the whole system is controlled by an output signal from the hook switch sensor 51.

Namely, the output signal from the hook switch sensor 51 allows the microprocessor 56 to drive the power supply 55 to turn on power. On the other hand, if the output signal from the hook switch sensor 51 is not present, the microprocessor 56 instructs the power supply 55 to turn off power.

Figure 5B:
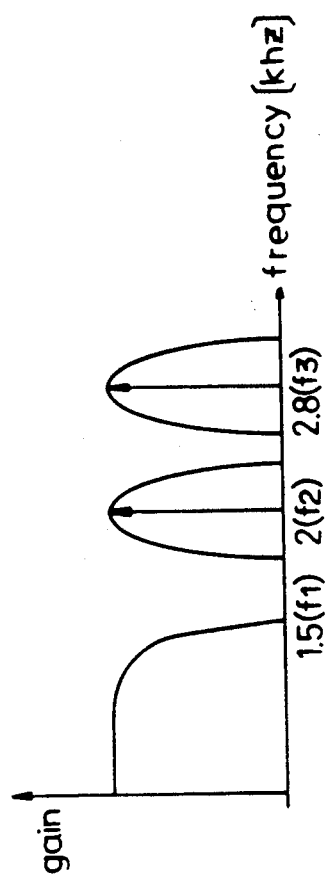
FIG. 5b illustrates frequency spectrum characteristics of the transmission line according to the present invention.

When the transmitting switch 52 has been pushed first by the transmitting side, or caller at power-ON, the microprocessor 56 designates the second frequency f2 as shown in FIG. 5b as the carrier frequency for modulation. Thus, the video signal from the counterpart can be modulated and transmitted only by the third frequency f3 an shown in FIG. 5b.

With the output signal from the hook switch sensor, it is possible to recognize the end state of the transmission and reception of the image data, or video signal. That is, because the caller hangs up a handset if his telephone call to the counterpart is finished, the hook switch of the telephone 7 is turned on, the state of which is sensed by the hook switch sensor 51, thereby allowing the microprocessor 56 to turn off power. As a result, the image telephone call between them is finished.

On the other hand, if the video signal from the counterpart was sent to the transmitting side before the transmitting switch 52 is pushed by the transmitting side, the microprocessor 56 perceives such state from the output signal from the frequency discriminator 54 and designates the third frequency f3 as shown in FIG. 5b as the carrier frequency of the video signal for transmission, since the carrier frequency of the video signal to be received is the second frequency f2 as shown in FIG. 5b.

Namely, of two video phones, one first transmitting the video signal, first selects the second frequency f2 as the carrier frequency.

As apparent from the above description, in video phones having been usually employed now, only between products in which frequencies set for modulation are equal to each other the intertransmission of the voice signal and the video signal is enabled.

Referring again to FIG. 4, a video signal transmitting means 100 is shown to include the hook switch sensor 51, the transmitting switch 52, the microprocessor 56 and the first video signal processing circuit 57.

Also, a video signal receiving means 200 includes the hook switch sensor 51, the frequency discriminator 54, the microprocessor 56 and the second video signal processing circuit 58.

FIG. 5b illustrates frequency spectrum characteristics of the transmission line according to the present invention.

Figure 5A:
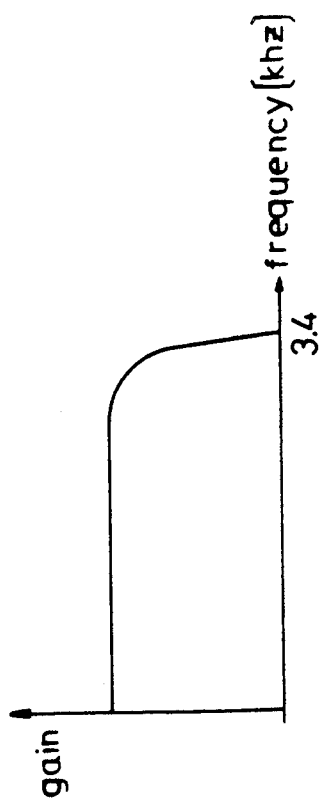
FIG. 5a illustrates a general frequency band of a transmission line.

In general, the telephone line has the frequency band limited to 3.4 KHz as shown in FIG. 5a.

In accordance with the present invention, in the frequency band of the telephone line, only frequency region below 1.5 KHz is used for the transmission of the voice signal, the second frequency carrier is designated at 2 KHz part and the third frequency carrier is designated at 2.8 KHz part, so that the voice signal and the video signal can be simultaneously transmitted and received. Therefore, the voice signal and the video signal modulated at the first frequency or the second frequency can be simultaneously seen and heard.

Figure 7:
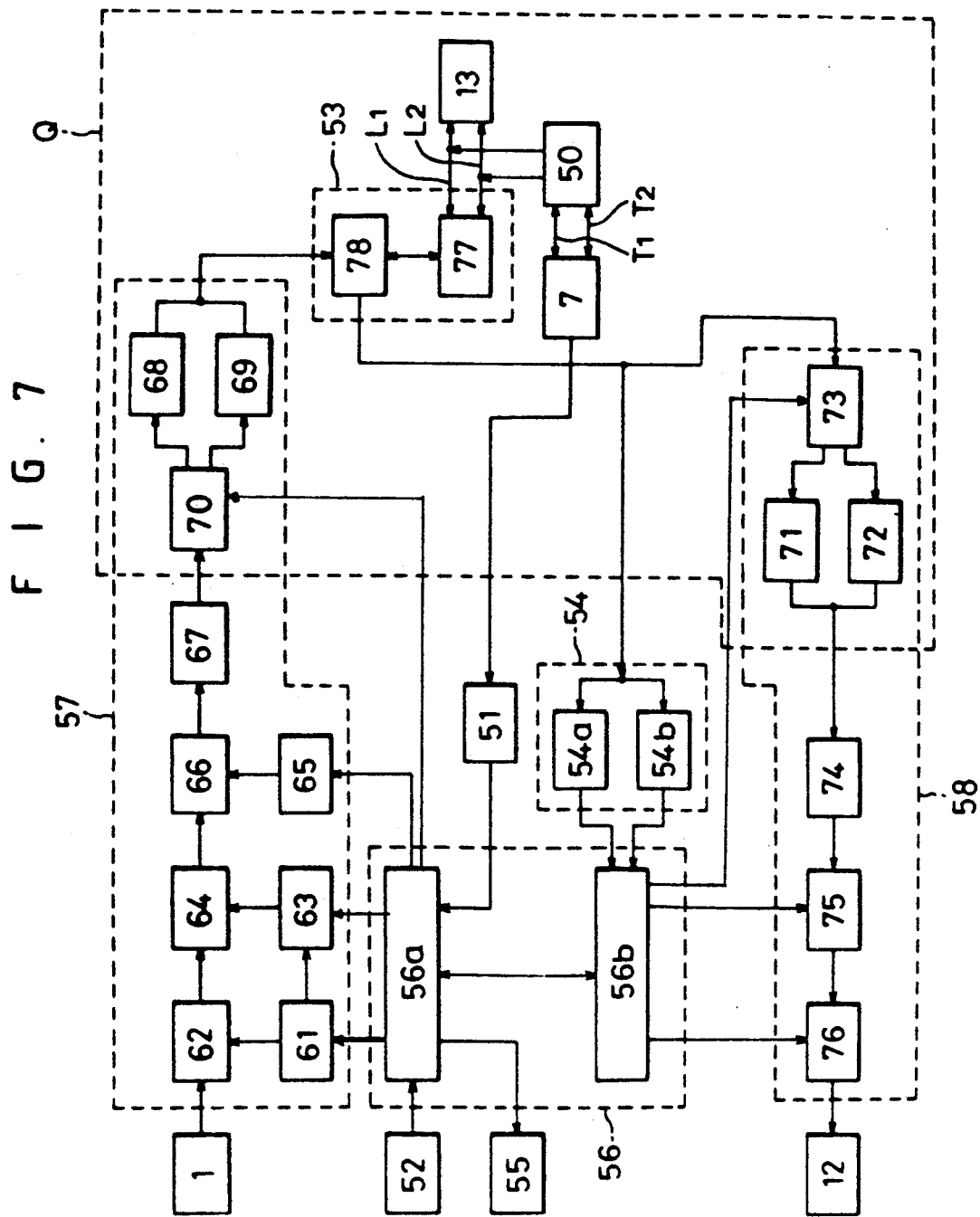
FIG. 7 is a detailed block diagram of the construction in FIG. 4.

Turning now to FIG. 7, the microprocessor 56 is shown to include a first microprocessor 56a, as a transmitting microprocessor, for providing a control signal for the first video signal processing circuit 57 and a second microprocessor 56b, as a receiving microprocessor, for providing a control signal for the second video signal processing circuit 58.

The first video signal processing circuit 57 includes a timing signal generator 61 for generating a clock signal, an A/D converter 62 for inputting the video signal from the self-camera 1 and digitizing the inputted video signal to be transmitted, in response to the clock signal from the timing signal generator 61, a memory controller 63 for generating read/wright select and address signals in response to the control signal from the first microprocessor 56a and the clock signal from the timing signal generator 61, a memory unit 64 for storing the digitized video signal from the A/D converter 62 in an addressed location in response to the read/wright select and address signals from the memory controller 63, a carrier generator 65 for generating the second frequency f2 carrier or the third frequency f3 carrier as shown in FIG. 5b in response to the control signal from the first microprocessor 56a, a modulator 66 for modulating the image data, or digitized video signal stored in the memory unit 66 by the frequency carriers generated by the carrier generator 65, a first amplifier 67 for amplifying an output signal from the modulator 66 by a predetermined amplification degree, a first band pass filter 68 for passing only video signal with the second frequency f2 component to the interface unit 53, a second band pass filter 69 for passing only video signal with the third frequency f3 component to the interface unit 53, and a first switching circuit 70 for selectively outputting an output signal from the first amplifier 67 to the first band pass filter 68 or the second band pass filter 69 in response to the control signal from the first microprocessor 56a.

Also, the second video signal processing circuit 58 includes a third band pass filter 71 for passing only video signal with the second frequency f2 component, a fourth band pass filter 72 for passing only video signal with the third frequency f3 component, a second switching circuit 73 for selectively outputting the video signal from the counterpart, inputted through the interface unit 53, to the third band pass filter 71 or the fourth band pass filter 72 in response to the control signal from the second microprocessor 56b, a second amplifier 74 for amplifying the video signal from the counterpart, passed through the third band pass filter 71 or the fourth band pass filter 72, by a predetermined amplification degree, a demodulator 75 for inputting an output signal from the second amplifier 74 and demodulating the inputted signal in response to the control signal from the second microprocessor 56b, and a D/A converter 76 for converting an output signal from the demodulator 75 into an analog signal and outputting the analog signal to the displaying monitor 12.

The interface unit 53 also includes a transmitting and receiving transformer 77 adapted for inputting and outputting simultaneously the video signals to be transmitted and received and a hybrid circuit 78 adapted for separately outputting the video signals to be received and transmitted, inputted through the transmitting and receiving transformer 77.

The frequency discriminator 54 is also provided with two tone decoders 54a and 54b for discriminating the frequency component of the video signal from the counterpart.

Now, the operation of the apparatus with the above-mentioned construction according to the present invention as shown in FIG. 7 will be described in detail.

First, if the hook switch is turned off, i.e., if the handset is picked up, then in response to the output signal from the hook switch sensor 51 adapted to sense ON-/OFF states of the hook switch, the first microprocessor 56a for transmission outputs the control signal to the power supply 55 to turn on it. The A/D converter 62 then converts the video signal outputted from the self-camera 1 into a digital signal in response to the clock signal supplied from the timing signal generator 61. The video signal digitized by the A/D converter 62 is stored in the location of the memory unit 64 corresponding to a predetermined address under the control of the memory controller 63, which generates the address signal and the read/wright select signals.

When the transmitting switch 52 has been pushed, the first microprocessor 56a for transmission designates the second frequency f2 as the carrier signal from the carrier generator 65, so that an output signal from the memory unit 64, or the digitized video signal stored in the memory unit 64 can be modulated by the carrier of the second frequency f2 component by the modulator 66. The modulated video signal to be transmitted is amplified by the predetermined amplification degree by the first amplifier 67 and then transferred to the first band pass filter 68 by the switching operation of the first switching circuit 70, the switching control of which is performed by the first microprocessor 56a for transmission.

The modulated video signal is filtered by the first band pass filter 68 allowing only second frequency f2 component to be inputted by the interface unit 53, and then sent to the counterpart via the telephone line 13. Simultaneously, the video signal sent from the counterpart is inputted through the same interface unit 53.

At this time, the second microprocessor 56b perceives whether the frequency component received is the second frequency f2 or the third frequency f3 in accordance with output signals from the tone decoders 54a and 54b in the frequency discriminator 54 and then controls the second switching circuit 73 for frequency selection in accordance with the discriminated result.

If the carrier of the video signal received is the second frequency f2 component, the video signal is inputted to the third band pass filter 71; if the carrier of the video signal received is the third frequency f3 component, the video signal is inputted to the fourth band pass filter 72. The video signal filtered in accordance with the frequency component as mentioned above is amplified by the predetermined amplification degree by the second amplifier 74, demodulated by the demodulator 75 under the control of the second microprocessor 56b and then converted into an analog signal by the D/A converter 76. In result, this analog signal, or video signal is displayed on the monitor 12.

On the other hand, in all signals being transmitted and received, only signal with low frequency component below 1.5 KHz, or the first frequency f1, is intertransferred as a voice signal between both sides, since the telephone 7 is connected to the telephone line 13 via the filter 50 adapted to pass only low frequency component below 1.5 KHz as shown in FIG. 5b.

Figure 8:
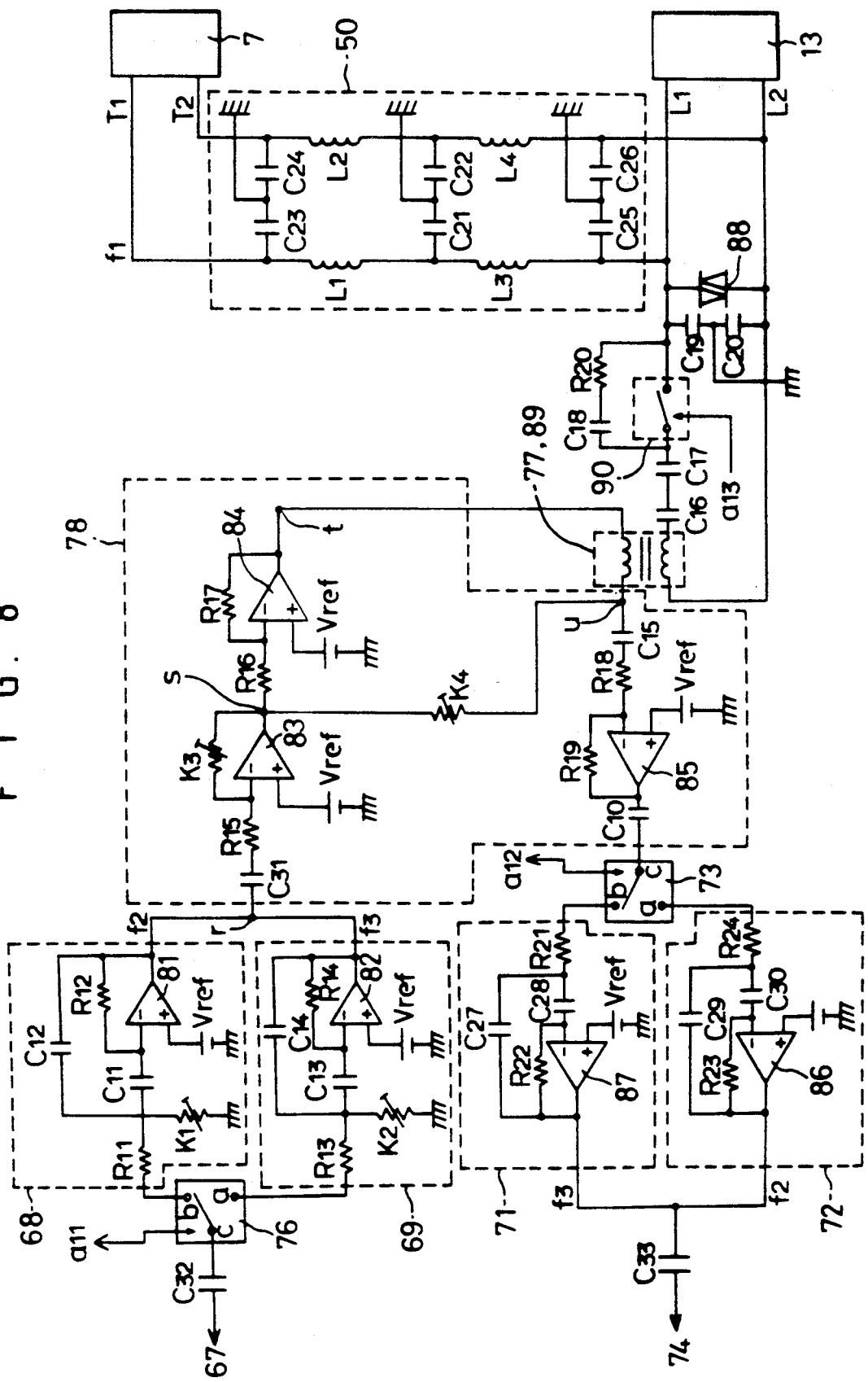
FIG. 8 is a detailed circuit diagram of a part Q in FIG. 7.

FIG. 8 is a detailed circuit diagram of a part Q in FIG. 7. In the drawing, the reference numerals R11 to R24 designate resistors, C11 to C33 capacitors, 81 to 86 operational amplifiers, 88 triac, K1 to K4 variable resistors and 90 switch.

Now, the operation of the part Q will be described in detail with reference to FIG. 8.

When the transmitting switch 52 in FIG. 7 has been pushed, the first microprocessor 56a for transmission of video signal outputs a control signal a11 for driving the first switching circuit 70, so that the output signal from the first amplifier 67 can be passed through the first band pass filter 68. Namely, the video signal to be transmitted with the second frequency f2 component is outputted to a point r. At this time, the variable resistor K3 connected to the operational amplifier 83 in the hybrid circuit 78 is adjusted to adjust a signal at a point s.

The phase of the video signal is once inverted by the operational amplifier 83 and again inverted by the operational amplifier 85. This means that the phase of the video signal at a point t is equal to that of the video signal at the point r. As a result, the video signal is sent out over the telephone line 13 by the transmitting and receiving transformer 77. On the other hand, the voice signal being transmitted and received is passed through the filter 50 connected to the telephone 7, thereby allowing only voice signal with frequency component below the first frequency f1 to be filtered. Therefore, the voice and video signals can be simultaneously sent via the telephone line 13. Also, the variable resistor K4 is adjusted such that the sum of the video signals at the point s, or output of the operational amplifier 83, and at the point t, or output of the operational amplifier 84, can become zero. Therefore, the video signal transmitted can be never received reversely.

On the other hand, the video signal sent from the counterpart is not inputted to the operational amplifiers 83 and 84, but to the second switching circuit 73 via the operational amplifier 85, from the transmitting and receiving transformer 77. The switching circuit 73 is switched by a control signal a12 from the second microprocessor 56b to transfer the video signal to be received, to the third band pass filter 71. That is, if the video signal to be transmitted is to have the second frequency f2 component, thus the video signal to be received is to have the third frequency f3 component.

Therefore, only voice signal with frequency component below the first frequency f1 can be sent, and the video signal to be transmitted can be sent with the second frequency f2 component at the same time as the video signal to be received is sent with the third frequency f3 component, thereby enabling the simultaneous transmission of the video and voice signals.

As hereinbefore described, the apparatus in accordance with the present invention can provide advantages as follows:

First, it is possible to send the voice signal simultaneously with the video signal via the single transmission line in the video phone, since the voice signal and the video signals to be transmitted and received can be sent with the three frequency regions different from one another, or f1 to f3 set within the frequency band of the transmission line; and Second, the transmission time can be shorted by the simultaneous transmission and reception of the video signal between the caller and the counterpart.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. In a video phone for transmitting and receiving a video signal and a voice signal by means of a single transmission line, said video phone having a standard telephone having a hook switch, a displaying monitor and a self-camera, an apparatus for transmitting and receiving the voice signal simultaneously with the video signal via the single transmission line, said apparatus comprising:

filtering means connected between said telephone and said transmission line, for inputting the voice signal from either said telephone or said transmission line and passing only voice signal with a frequency region below a first frequency set within a frequency band of said transmission line;

video signal receiving means for discriminating if a carrier frequency in the video signal being sent via said transmission line from a counterpart is which of a second frequency or a third frequency set within said frequency band of said transmission line, demodulating the video signal by one of said second and third frequencies depending upon the discriminated result, and outputting the demodulated video signal to said displaying monitor;

video signal transmitting means for inputting the video signal from said self-camera, modulating the video signal with the other of said second and third frequencies differently from said video signal receiving means and outputting the modulated video signal to said transmission line;

interfacing means connected among said transmission line, said video signal receiving means and said video signal transmitting means, for separately outputting the video signals to be received and transmitted;

a hook switch sensor for sensing ON/OFF states of said hook switch;

a transmitting switch for outputting a control signal for transmission of the video signal;

wherein said video signal transmitting means further comprises first video signal processing means for inputting the video signal from said self-camera and modulating and band-pass filtering the inputted video signal in response to an external control signal to send the modulated and band-pass filtered video signal to the counterpart;

wherein said video signal receiving means further comprises second video signal processing means for inputting the video signal from the counterpart via said transmission line and modulating and band-pass filtering the inputted video signal in response to an external control signal to display the modulated and band-pass filtered video signal through said monitor;

wherein said interfacing means further comprises an interface unit connected among said transmission line, said first video signal processing means and said second video signal processing means, for separately outputting the video signals to be received and transmitted;

wherein said video signal receiving means further comprises a frequency discriminator for discriminating if the carrier frequency in the video signal from the counterpart is which of said second frequency or said third frequency set within said frequency band of said transmission line and outputting an acknowledge signal depending upon the discriminated result;

a microprocessor for inputting output signals from said hook switch sensor, said transmitting switch and said frequency discriminator and outputting control signals to said first and second video signal processing means;

said microprocessor adapted for perceiving by said output signals from said frequency discriminator and said transmitting switch that frequency component of the video signal sent from the counterpart was one of said second or third frequencies, designating the other of said second or third frequencies as the carrier frequency of the video signal for transmission in accordance with the perceived result, and outputting control signals according to the perceived and designated results to said first and second video signal processing means; and wherein said first video signal processing means further comprises: a timing signal generator for generating a clock signal, an A/D converter for inputting the video signal from said self-camera and digitizing the inputted video signal to be transmitted, in response to said clock signal from said timing signal generator, a memory controller for generating read/write select and address signals in response to the control signal from said microprocessor and said clock signal from said timing signal generator, a memory unit for storing the digitized video signal from said A/D converter in response to said read/- write select and address signals from said memory controller, a carrier generator for generating said second frequency carrier or said third frequency carrier in response to the control signal from said microprocessor, a modulator for modulating the digitized video signal stored in said memory unitr146an output signal from said carrier generator, a first amplifier for amplifying an output signal from said modulator, a first band pass filter for passing only video signal with said second frequency component to said interface unit, a second band pass filter for passing only video signal with said third frequency component to said interface unit, and a first switching circuit for selectively outputting an output signal from said first amplifier to said first band pass filter or said second band pass filter in response to the control signal from said microprocessor.

2. An apparatus as set forth in claim 1, wherein said second video signal processing means includes:

a third band pass filter for passing only video signal with said second frequency component;

a fourth band pass filter for passing only video signal with said third frequency component;

a second switching circuit for selectively outputting the video signal from the counterpart, inputted through said interface unit, to said third band pass filter or said fourth band pass filter in response to the control signal from said microprocessor;

a second amplifier for amplifying the video signal from the counterpart, passed through said band pass filter or said fourth band pass filter;

a demodulator for inputting an output signal from said second amplifier and demodulating the inputted signal in response to the control signal from said microprocessor; and a D/A converter for converting an output signal from said demodulator into an analog signal and outputting the analog signal to said displaying monitor.

3. An apparatus as set forth in claim 2, wherein said interfacing means includes:

a transmitting and receiving transformer for inputting and outputting simultaneously the video signals to be transmitted and received; and a hybrid circuit for separately outputting the video signals to be received and transmitted.

4. An apparatus as set forth in claim 2, further comprising a power supply connected to said microprocessor and wherein said microprocessor outputs a control signal according to said ON/OFF states of said hook switch to said power supply to turn on/off power.

5. An apparatus as set forth in claim 1, wherein said interfacing means includes:

a transmitting and receiving transformer for inputting and outputting simultaneously the video signals to be transmitted and received; and a hybrid circuit for separately outputting the video signals to be received and transmitted.

6. An apparatus as set forth in claim 1, further comprising a power supply connected to said microprocessor and wherein said microprocessor outputs a control signal according to said ON/OFF states of said hook switch to said power supply to turn on/off power.

* * * * *